(12) United States Patent
Schrader et al.

(10) Patent No.: US 8,087,713 B2
(45) Date of Patent: Jan. 3, 2012

(54) TONNEAU COVER STORAGE SYSTEM FOR MOTOR VEHICLES

(75) Inventors: Michael A. Schrader, Plain City, OH (US); Oscar Antinero Caraan, Delaware, OH (US); Riley Patrick Lind, Dublin, OH (US); Michael Peterson, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 122 days.

(21) Appl. No.: 12/558,082

(22) Filed: Sep. 11, 2009

(65) Prior Publication Data
US 2011/0062744 A1    Mar. 17, 2011

(51) Int. Cl.
*B60P 7/02* (2006.01)
(52) U.S. Cl. .................................. 296/100.18
(58) Field of Classification Search ............. 296/100.18, 296/117, 100.02, 100.1, 100.17, 100.01, 296/108, 100.09, 37.6, 107.08, 100.06, 100.07, 296/100.15, 100.16
See application file for complete search history.

(56) References Cited

U.S. PATENT DOCUMENTS

| | | | | |
|---|---|---|---|---|
| 3,146,824 A | * | 9/1964 | Veilleux | 160/23.1 |
| 3,768,540 A | * | 10/1973 | McSwain | 160/23.1 |
| 3,774,958 A | * | 11/1973 | Thorpe | 296/98 |
| 4,563,034 A | | 1/1986 | Lamb | |
| 4,784,427 A | | 11/1988 | Burgess | |
| 4,786,099 A | * | 11/1988 | Mount | 296/98 |
| 4,792,178 A | * | 12/1988 | Kokx | 296/98 |
| 4,795,206 A | | 1/1989 | Adams | |
| 4,807,921 A | | 2/1989 | Champie, III et al. | |
| 4,889,381 A | * | 12/1989 | Tamblyn et al. | 296/98 |
| 4,901,895 A | | 2/1990 | Gancarz | |
| 5,040,843 A | * | 8/1991 | Russell et al. | 296/98 |
| 5,251,950 A | | 10/1993 | Bernardo | |
| 5,330,246 A | | 7/1994 | Bernardo | |
| 5,423,588 A | * | 6/1995 | Eglinton | 296/98 |
| 5,655,807 A | * | 8/1997 | Rosario | 296/98 |
| 5,775,765 A | * | 7/1998 | Kintz | 296/98 |
| 6,007,128 A | | 12/1999 | Hines, Jr. | |
| 6,012,754 A | | 1/2000 | Clare et al. | |
| 6,053,556 A | | 4/2000 | Webb | |
| 6,129,401 A | | 10/2000 | Neag et al. | |
| 6,276,735 B1 | | 8/2001 | Champion | |
| 7,677,624 B1 | * | 3/2010 | Koski et al. | 296/1.07 |

* cited by examiner

*Primary Examiner* — Kiran B. Patel
(74) *Attorney, Agent, or Firm* — Cliff Vaterlaus; Michael A. Forhan; Eley Law Firm Co. LPA

(57) ABSTRACT

A tonneau cover storage system for a vehicle includes a cargo compartment having a first sidewall and a cargo opening. A cavity is formed in the first sidewall. A container is pivotably attached to the first sidewall proximate the cavity at a first pivot point, and has a container opening sized and shaped to selectably fit into the cavity. A lid to selectably close off the container opening is also pivotably attached to the first pivot point and is pivotable independently of the container. A flexible tonneau cover is selectably configurable between a stowed condition within the container and a deployed condition closing off the cargo opening. The container is movable to a position within the cavity when the tonneau cover is in the stowed condition, and is further movable to a position outside the cavity when the tonneau cover is in the deployed condition.

12 Claims, 16 Drawing Sheets

TONNEAU COVER STORAGE SYSTEM FOR MOTOR VEHICLES

FIELD

The present invention relates generally to a cover apparatus which selectively covers or exposes a compartment area of a motor vehicle, particularly to a storage system for the cover apparatus.

BACKGROUND

Tonneau cover assemblies provide a means to conceal the contents of a cargo area of a hatchback, station wagon, pick-up truck or other type of motor vehicle. The tonneau cover may be made of a flexible vinyl or fabric material that attaches to the perimeter of the cargo area, and which can be detached and rolled up when not in use. The rolled-up tonneau cover is typically stored at an edge of the cargo area. For example, a roll-up tonneau cover is typically stored at a forward end of a cargo bed of a pick-up truck, just aft of the passenger compartment.

Such storage arrangements are generally unsatisfactory for a number of reasons. Firstly, the tonneau cover is not aesthetically pleasing when rolled up, especially if care is not taken to neatly roll the cover. In addition, the tonneau cover tends to rattle or flap in the windstream when the vehicle is in motion. The rolled-up cover also consumes a portion of the cargo area that could otherwise be utilized for cargo. Lastly, the rolled-up cover thus exposed to the elements can accumulate debris and moisture, accelerating deterioration of the cover and promoting the growth of mold. There is a need for an improved way to store a tonneau cover when it is not in use.

SUMMARY

A storage system for a tonneau cover is disclosed according to an embodiment of the present invention. The storage system comprises a pivotable container having a lid. A roll-up tonneau cover is stored within the container and the lid is closed when the cover is not in use. The container pivots into a cavity formed in the cargo area, generally flush with a sidewall of the cargo area. The tonneau cover is thus stored out of sight and, not being exposed to the vehicle windstream, does not rattle or flap when the vehicle is in motion. In addition, the present invention does not consume cargo space and also protects the tonneau cover from the elements when in storage. When the tonneau cover is to be used the container is pivoted out of the cavity and the lid is pivoted to an open position. The cover is extended from the container and attached to the remaining sidewalls of the cargo area. Finally, the lid is pivoted back to a closed position proximate the container, the tonneau cover extending through a narrow opening between the container and the lid.

According to one embodiment, a tonneau cover storage system for a vehicle includes a cargo compartment having a first sidewall and a cargo opening. A cavity is formed in the first sidewall. A container is pivotably attached to the first sidewall proximate the cavity at a first pivot point, and has a container opening sized and shaped to selectably fit into the cavity. A lid to selectably close off the container opening is also pivotably attached to the first pivot point, and is pivotable independently of the container. A flexible tonneau cover is selectably configurable between a stowed condition within the container and a deployed condition closing off the cargo opening. The container is movable to a position within the cavity when the tonneau cover is in the stowed condition, and is further movable to a position outside the cavity when the tonneau cover is in the deployed condition.

According to another embodiment, a method for storing a tonneau cover for a vehicle comprises the steps of providing a cargo compartment having a first sidewall and a cargo opening, and forming a cavity in the first sidewall. Further steps include pivotably attaching a container to the first sidewall proximate the cavity at a first pivot point, the container having a container opening and being sized and shaped to selectably fit into the cavity, and pivotably attaching a lid to the first pivot point, the lid selectably closing off the container opening and being pivotable independently of the container. A flexible tonneau cover is also provided, the cover being selectably configurable between a stowed condition within the container and a deployed condition closing off the cargo opening. The container is movable to a position within the cavity when the tonneau cover is in the stowed condition, and is further movable to a position outside the cavity when the tonneau cover is in the deployed condition.

According to yet another embodiment, a tonneau cover storage system for a vehicle includes a cargo compartment having a first sidewall and a cargo opening. A cavity is formed in the first sidewall, the cavity having a cavity opening. A lid is pivotably attached to a first pivot point, the lid selectably closing off the cavity opening. A flexible tonneau cover is selectably configurable between a stowed condition within the cavity and a deployed condition closing off the cargo opening.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION

In the discussion that follows, like reference numbers refer to like elements in the various figures.

Figure 1:
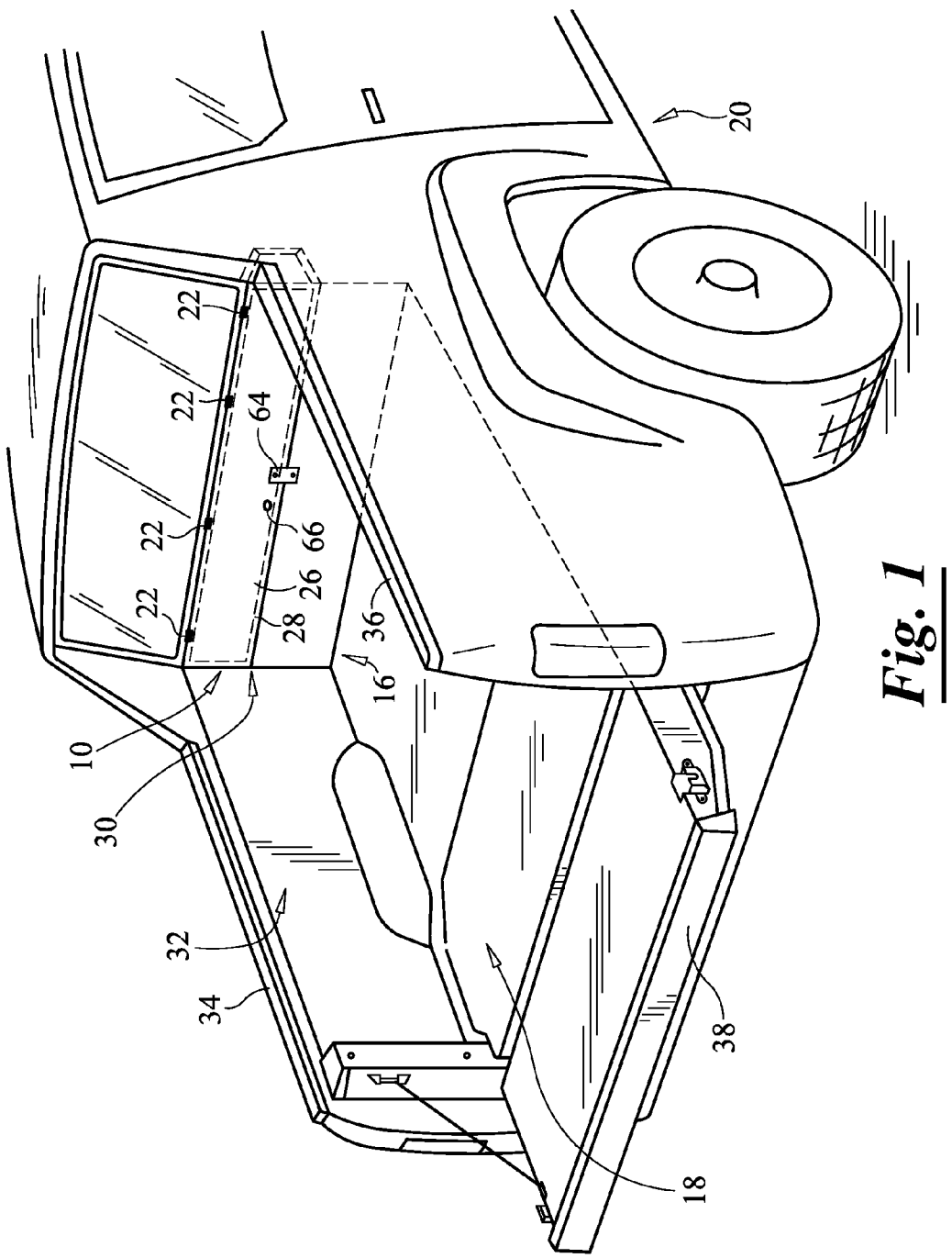
FIG. 1 shows the general arrangement of a tonneau cover storage system for a motor vehicle according to an embodiment of the present invention.
Figure 2:
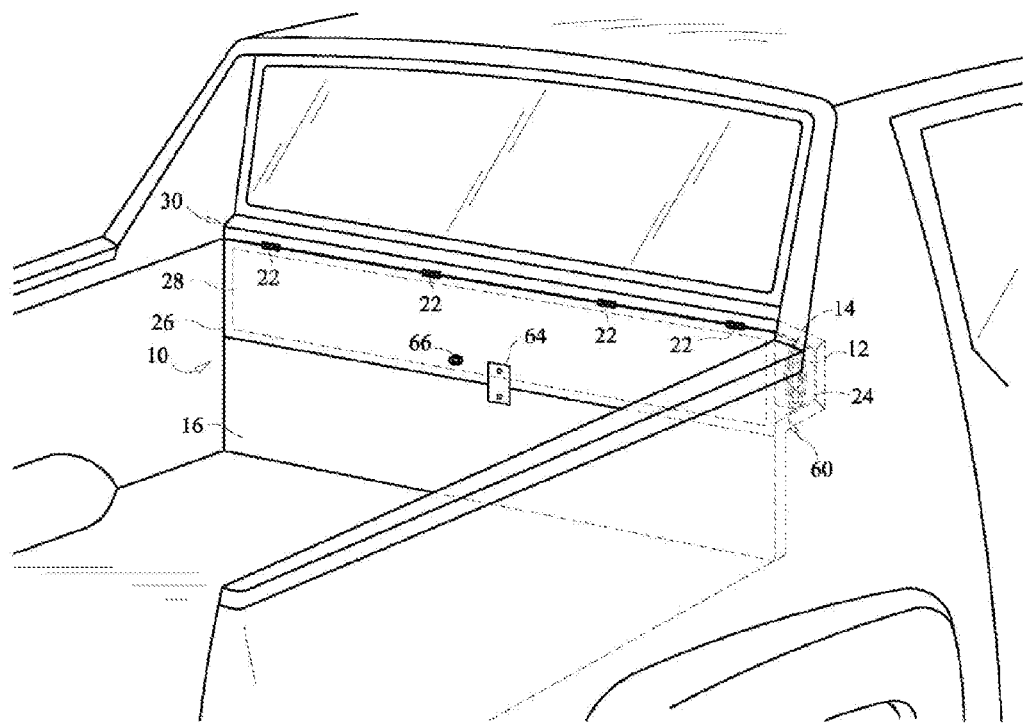
FIG. 2 shows details of the storage system of FIG. 1.
Figure 3:
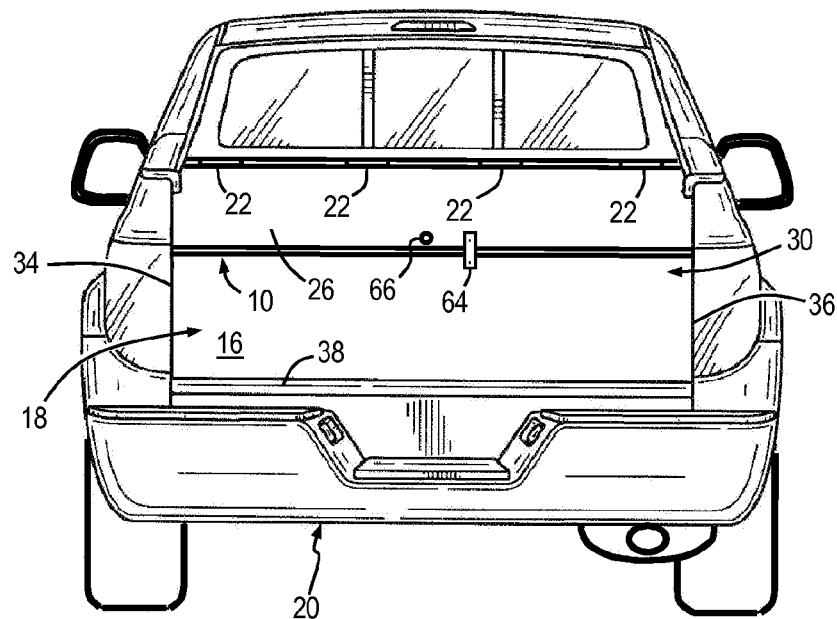
FIG. 3 is an elevational view of the storage system of FIG. 1.

The general arrangement of a tonneau cover storage system 10 is shown in FIGS. 1-3 according to an embodiment of the present invention. Storage system 10 includes a container 12 that is sized and shaped to receive a tonneau cover 14. Container 12 is pivotably coupled to a vertical frame member 16 of a cargo compartment 18 of a vehicle 20 by one or more hinges 22, and is configured to be received by a cavity 24 of the vertical frame member. A lid 26 selectably closes off a container opening 28 of container 12. Lid 26 is also pivotably coupled to vertical frame member 16 by hinge 22, and is pivotable independently of container 12.

Container 12 is sized and shaped to receive tonneau cover 14. In the embodiment shown in FIGS. 1 and 2 container 12 extends across most or all of the width of a forward sidewall 30 (interchangeably termed "forward wall") of cargo compartment 18, the forward sidewall including storage system 10 and vertical frame member 16. Container 12 may be made from any material suitable for use with storage system 10 and the expected environment including, without limitation, metal, plastic and composites. In addition, the various components of container 12 may be formed in any conventional manner including, without limitation, casting, machining, forming, molding and stamping. Furthermore, container 12 may be finished in any conventional manner, such as painting, coating or plating, or may be left unfinished.

Figure 4:
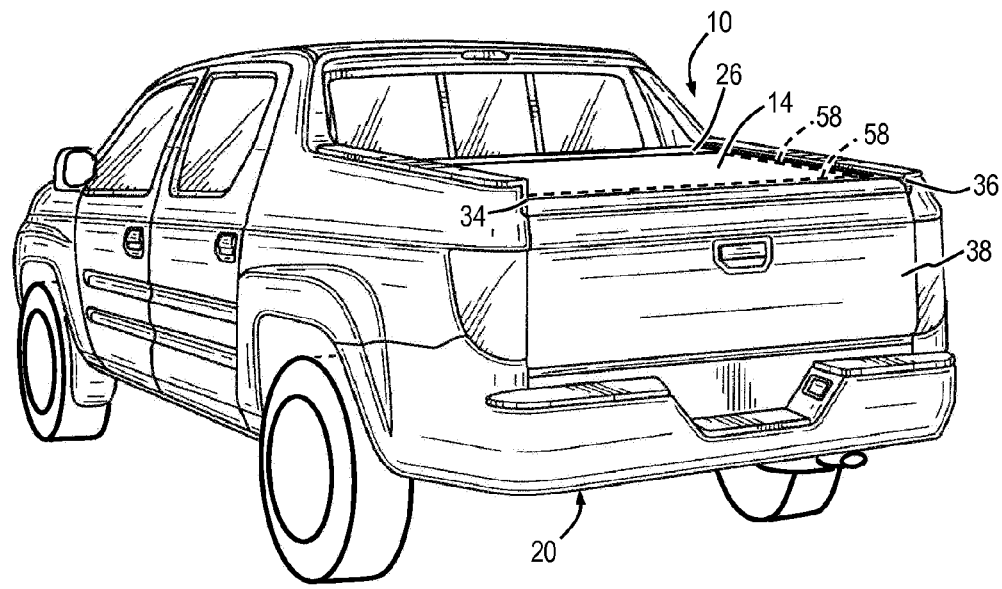
FIG. 4 shows the storage system of FIG. 1 in a deployed condition.
Figure 5:
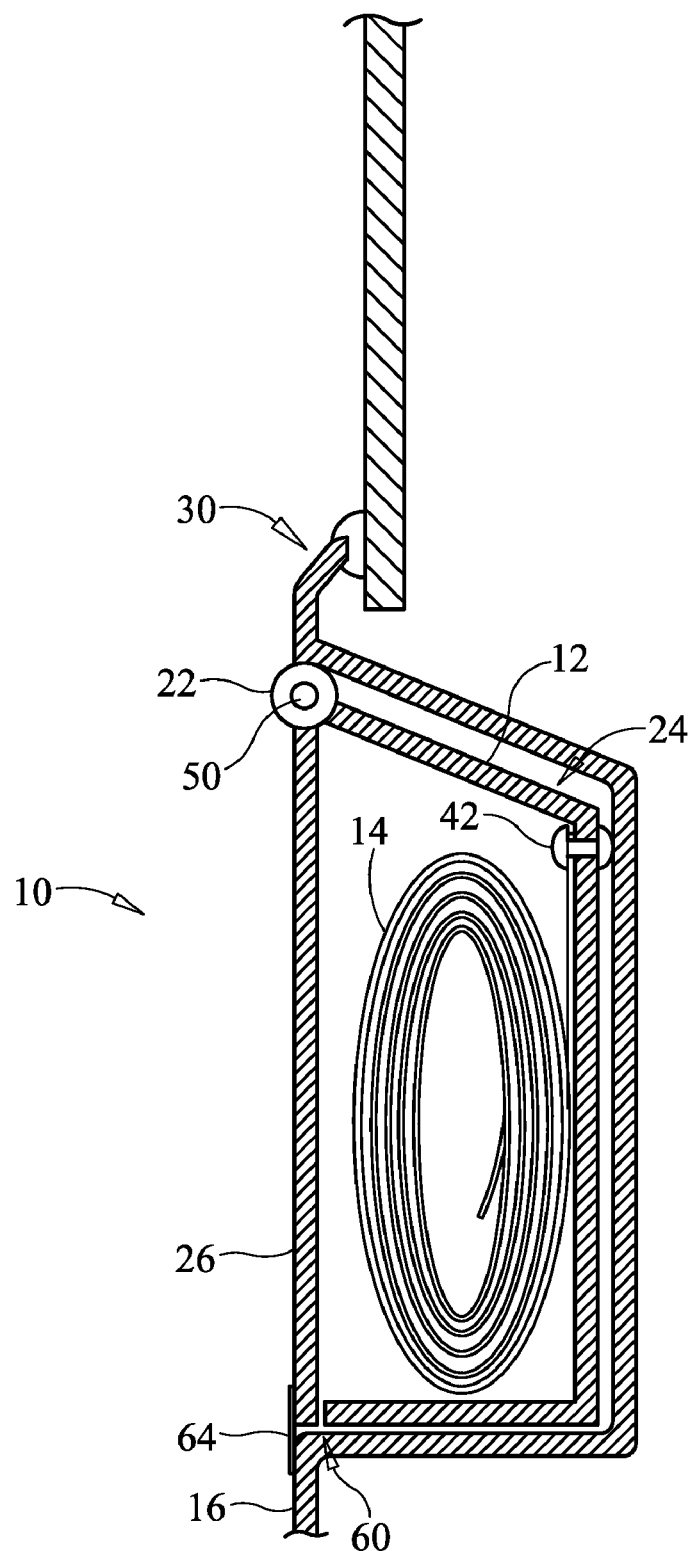
FIG. 5 is a schematic diagram of the storage system of FIG. 1 in a stowed condition.
Figure 7:
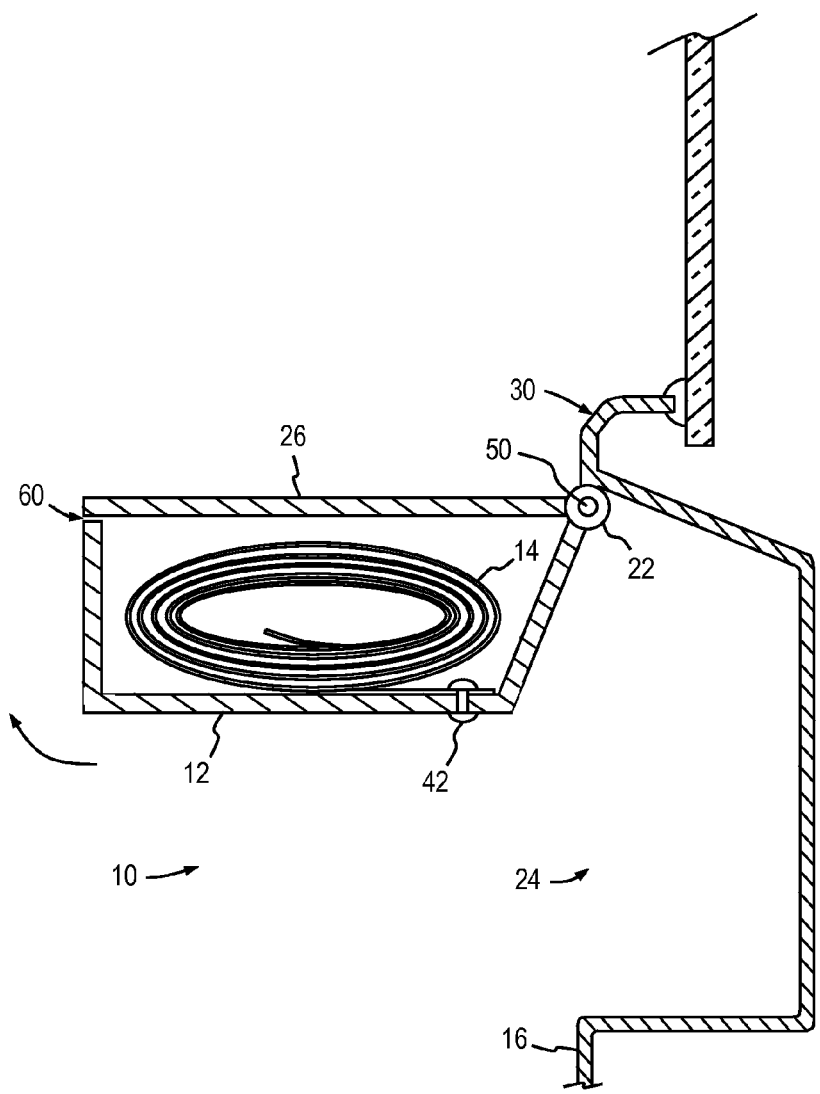
FIG. 7 is a schematic diagram of the system of FIG. 1 showing the initial deployment of a tonneau cover from a stowed condition according to an embodiment of the present invention.

With reference now to FIGS. 1 and 4, tonneau cover 14 is sized and shaped to generally cover an opening 32 of cargo compartment 18, the opening being defined by a perimeter formed by forward sidewall 30, a pair of spaced-apart lateral sidewalls 34, 36 and a pivotable tailgate 38. Tonneau cover 14 may be made from any type of pliable material suitable for tonneau cover storage system 10 and the expected environment including, without limitation, fabric, plastics such as vinyl, elastics such as natural and synthetic rubber, and leather. Tonneau cover 14 may be secured at one end to the interior of container 12 as shown in FIG. 5 with one or more fasteners 42, such as hook-and-loop, snaps, clamps, rivets and screws. Alternatively, tonneau cover 14 may be attached to lid 26 with one or more fasteners 42. Tonneau cover 14 may also be entirely removable from container 12.

Figure 6:
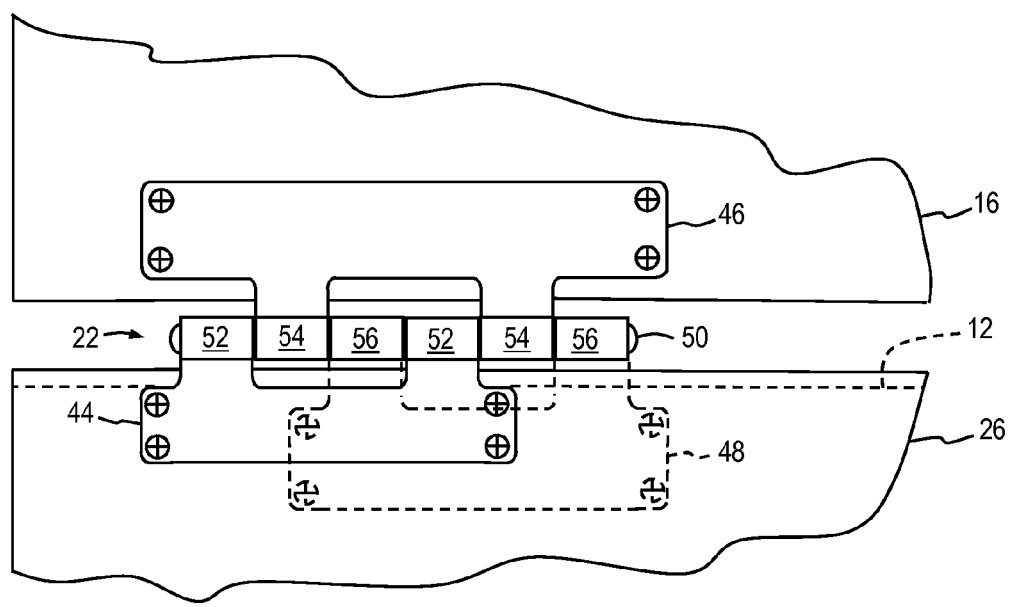
FIG. 6 shows details of a hinge for use with a tonneau cover storage system for a motor vehicle according to an embodiment of the present invention.

Storage system 10 includes at least one hinge 22 as shown in FIGS. 1, 2 and 6. In one embodiment of the present invention a plurality of hinges 22 may each be configured as shown in FIG. 6 wherein a first pivot hinge portion 44, attached to lid 26, is pivotably coupled to a stationary hinge portion 46 that is attached to vertical frame member 16. A second hinge pivot portion 48, attached to container 12, is also pivotably coupled to stationary hinge portion 46. A retainer pin 50 is inserted through a pair of aligned, hollow connectors 52 of first hinge pivot portion 44, a pair of connectors 54 of stationary hinge portion 46 and a pair of connectors 56 of second hinge pivot portion 48 to secure the hinge assembly together. In another embodiment of the present invention hinge 22 may be configured as a continuous "piano" hinge extending across most or all of the width of container 12, lid 26 and forward sidewall 30. In still other embodiments hinge 22 may be a plastic "living hinge."

Lid 26 is sized and shaped to selectably close off opening 28 of container 12. In the embodiment shown in FIGS. 1 and 2, lid 26 extends across most or all of the width of forward sidewall 30 of cargo compartment 18. Lid 26 may be made from any type or combination of material suitable for use with storage system 10 and the expected environment including, without limitation, metal, plastic and composites. In addition, the various components of lid 26 may be formed in any conventional manner including, without limitation, casting, machining, forming, molding and stamping. Furthermore, lid 26 may be finished in any conventional manner such as painting, coating or plating, or may be left unfinished.

Figure 8:
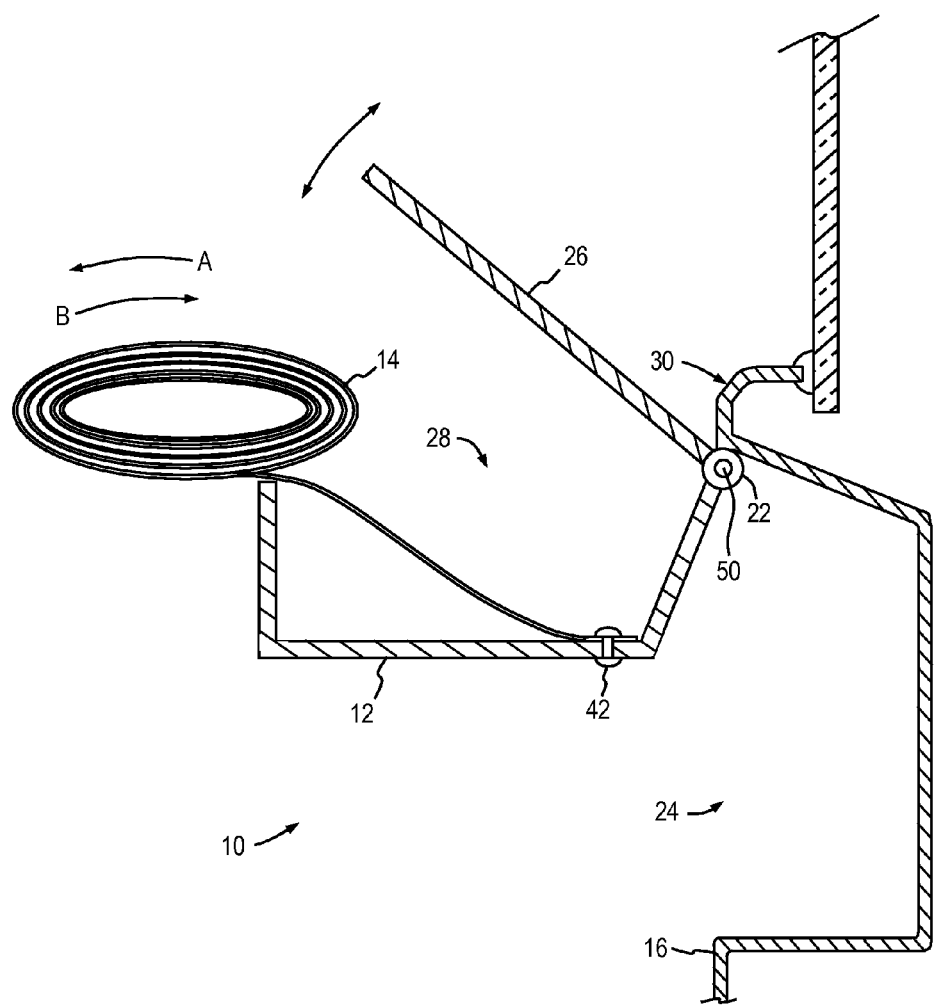
FIG. 8 is a schematic diagram of the system of FIG. 1 showing the tonneau cover of FIG. 7 being deployed and stowed according to an embodiment of the present invention.
Figure 9:
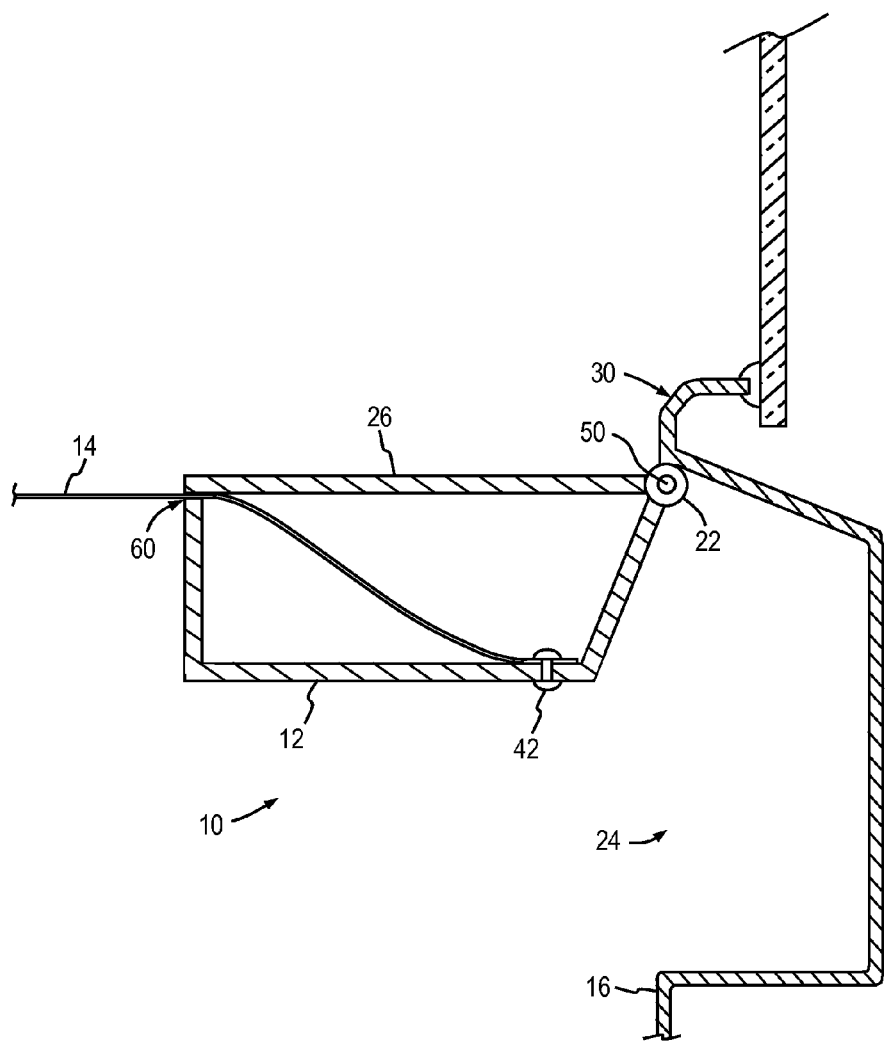
FIG. 9 is a schematic diagram of the system of FIG. 1 showing the tonneau cover of FIG. 7 in a deployed condition according to an embodiment of the present invention.

With reference to FIGS. 1 through 9 together, in operation tonneau cover 14 is deployed by pivoting container 12 out of cavity 24 (FIG. 7), opening lid 26 and unrolling the cover (FIG. 8), moving from forward sidewall 30 toward tailgate 38 (FIG. 1) as indicated by arrow "A" (FIG. 8). When tonneau cover 14 is completely unrolled the cover is secured to the perimeter of opening 32 of cargo compartment 18 with one or more fasteners 58 (FIG. 4) such as, for example, hook-and-loop, snaps, clamps and screws (FIG. 4). Lid 26 is closed, thereby closing off container opening 28, the tonneau cover extending through a narrow opening 60 delimited by the lid and container 12 (FIG. 9).

Conversely, tonneau cover 14 is stowed by rolling the cover into a generally cylindrical form, moving from tailgate 38 toward forward sidewall 30 (FIG. 1), as indicated by arrow "B" (FIG. 8). Lid 26 is lifted and tonneau cover 14 is placed into container 12 (FIG. 6). Lid 26 is closed (FIG. 7), and container 12 is pivoted into cavity 24 to stow the tonneau cover (FIGS. 2 and 5).

Figure 10:
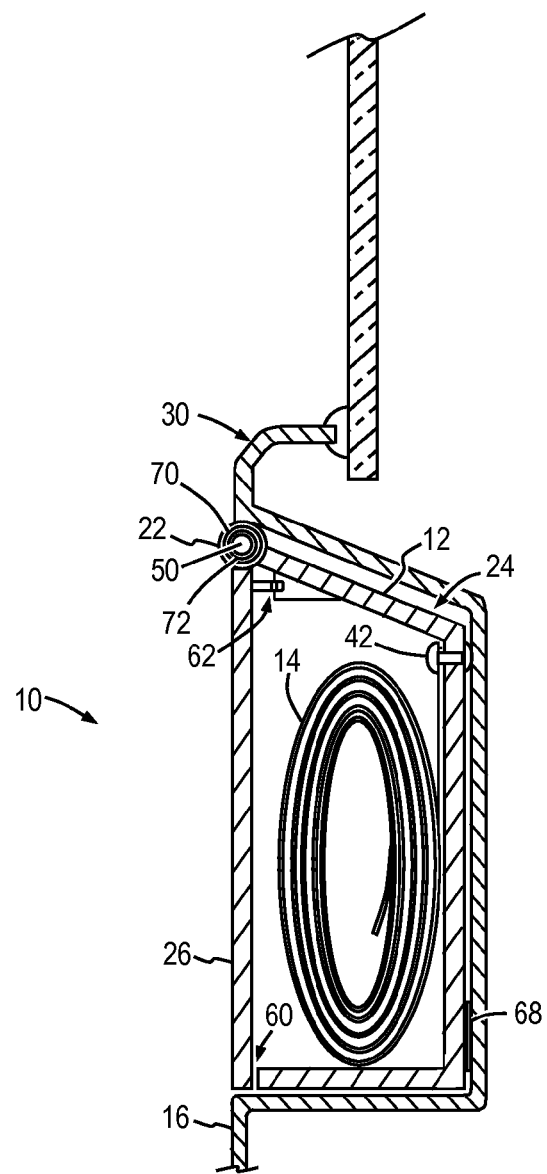
FIG. 10 is a schematic diagram of the system of FIG. 1 showing optional features of a tonneau cover storage system for a motor vehicle according to several embodiments of the present invention.

In some embodiments of the present invention lid 26 may be selectably secured to container 12 with a lid latch 62, as generally shown in FIG. 10. Lid latch 62 may be any type of latch suitable for a particular configuration of storage system 10 including, without limitation, hook-and-loop, magnetic latches, biased latches and friction latches.

In other embodiments of the present invention a lock 64, generally shown in FIGS. 1 and 3, may be included to selectably lock lid 24 to vertical frame member 16 to deter tampering by unauthorized personnel. Lock 64 may be any type of lock suitable for a particular configuration of storage system 10 including, without limitation, key locks, combination locks, hasp locks and magnetic locks. Lock 64 may further be a padlock inserted through apertures in vertical frame member 16 and lid 26, or may be built into either the vertical frame member or the lid and having a locking element to selectably secure together the vertical frame member and the lid.

Lid 26 optionally includes a grip 66, as generally shown in FIGS. 1 and 2. Grip 66 may take any form convenient for a user to pivot lid 26. Example grips 66 include, without limitation, finger-hold apertures, tabs, handles and knobs.

In still other embodiments of the present invention container 12 may be selectably secured to vertical frame member 16 within cavity 24 with a container latch 68, as generally shown in FIG. 10. Container latch 68 may be any type of latch suitable for a particular configuration of storage system 10 including, without limitation, hook-and-loop, magnetic latches, biased latches and friction latches.

In some embodiments a lid biasing member 70, such as a torsion spring, may be incorporated into hinges 22 as generally shown in FIG. 10 to urge lid 26 toward or away from container 12 as desired. Alternatively, a biasing member may be attached between lid 26 and container 12. Likewise, a biasing member 72, such as a torsion spring, may be incorporated into hinges 22 as generally shown in FIG. 10 to urge container 12 toward or away from vertical frame member 16 as desired. Alternatively, a biasing member may be attached between container 12 and vertical frame member 16. In other embodiments hinges 22 may be friction-type hinges having sufficient torque to maintain container 12 and/or lid 26 at any desired position within their range of pivotable travel.

Figure 11:
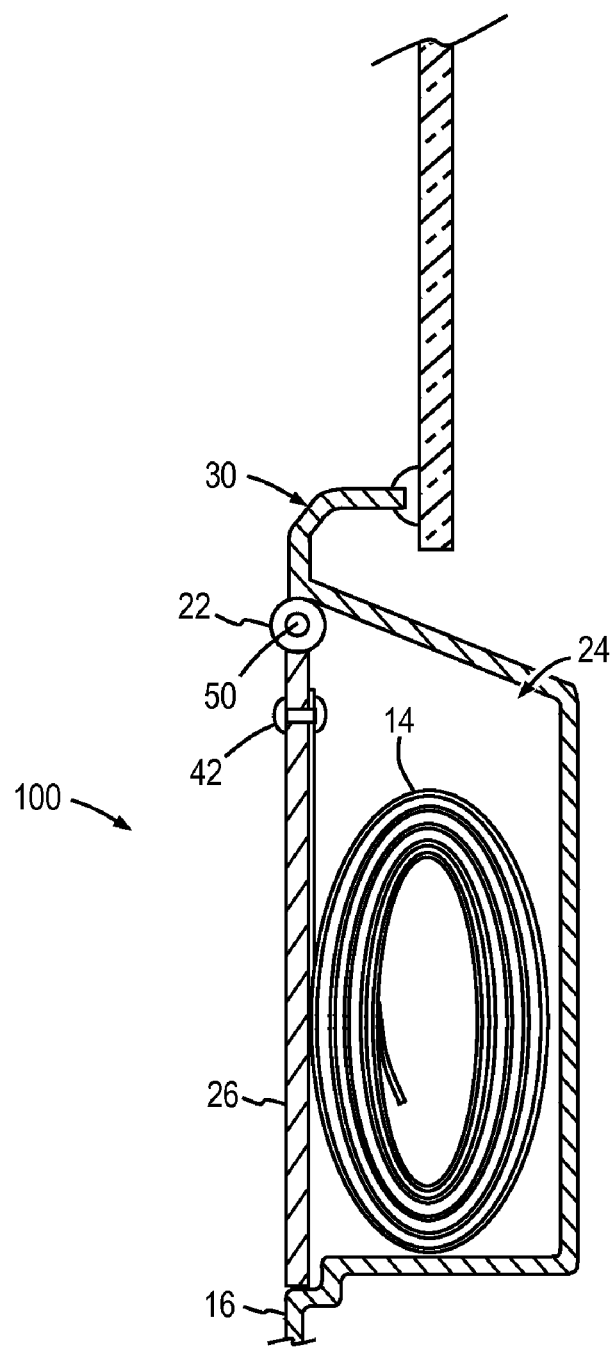
FIG. 11 is a schematic diagram of an alternate embodiment of a tonneau cover storage system for a motor vehicle, shown in a stowed condition.
Figure 12:
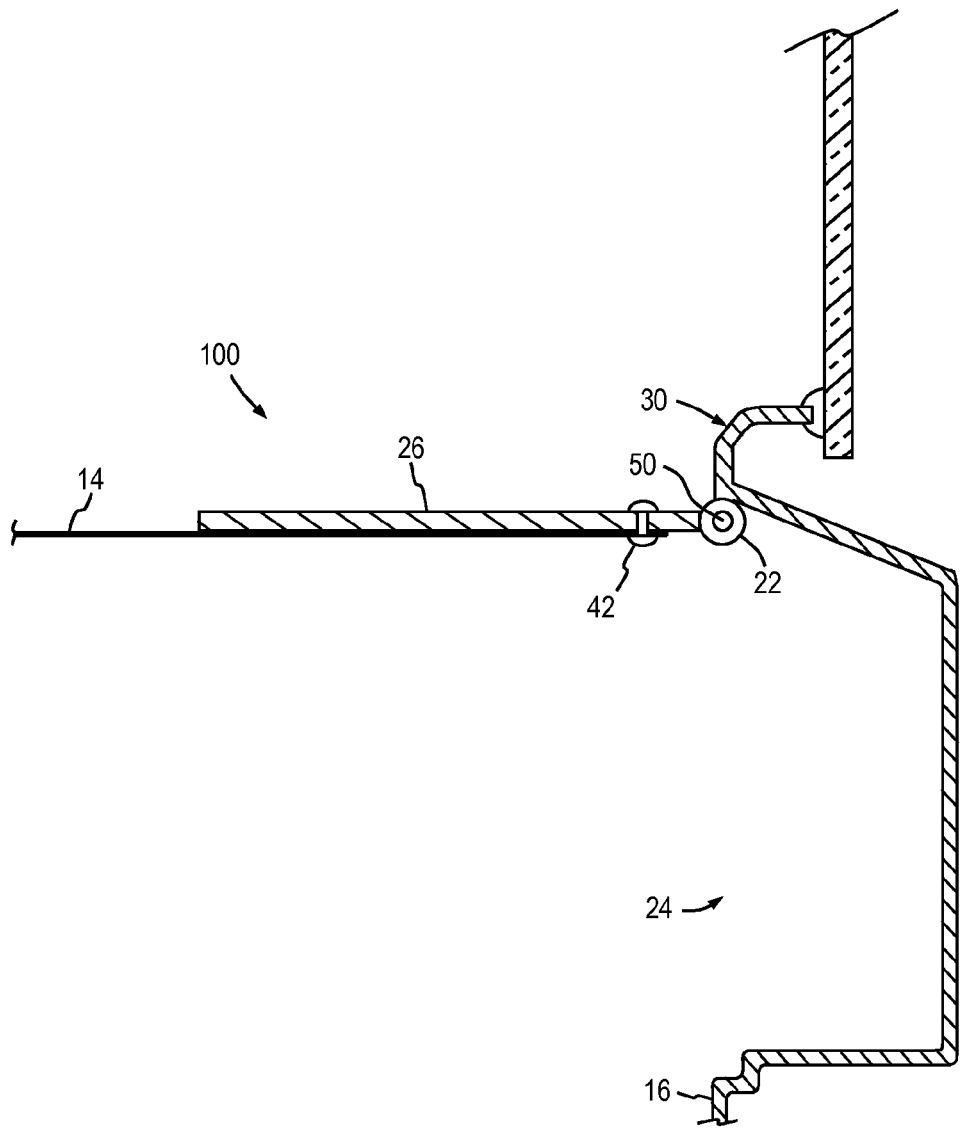
FIG. 12 is a schematic diagram of the system of FIG. 11 in a deployed condition.

A tonneau cover storage system 100 is shown in FIGS. 11 and 12 according to an alternate embodiment of the present invention. In this embodiment cavity 24 is utilized for storage of tonneau cover 14, lid 26 selectably closing off the cavity. Tonneau cover 14 may be secured at one end to lid 26 with one or more fasteners 42. Storage system 100 is otherwise similar to system 10.

Figure 13:
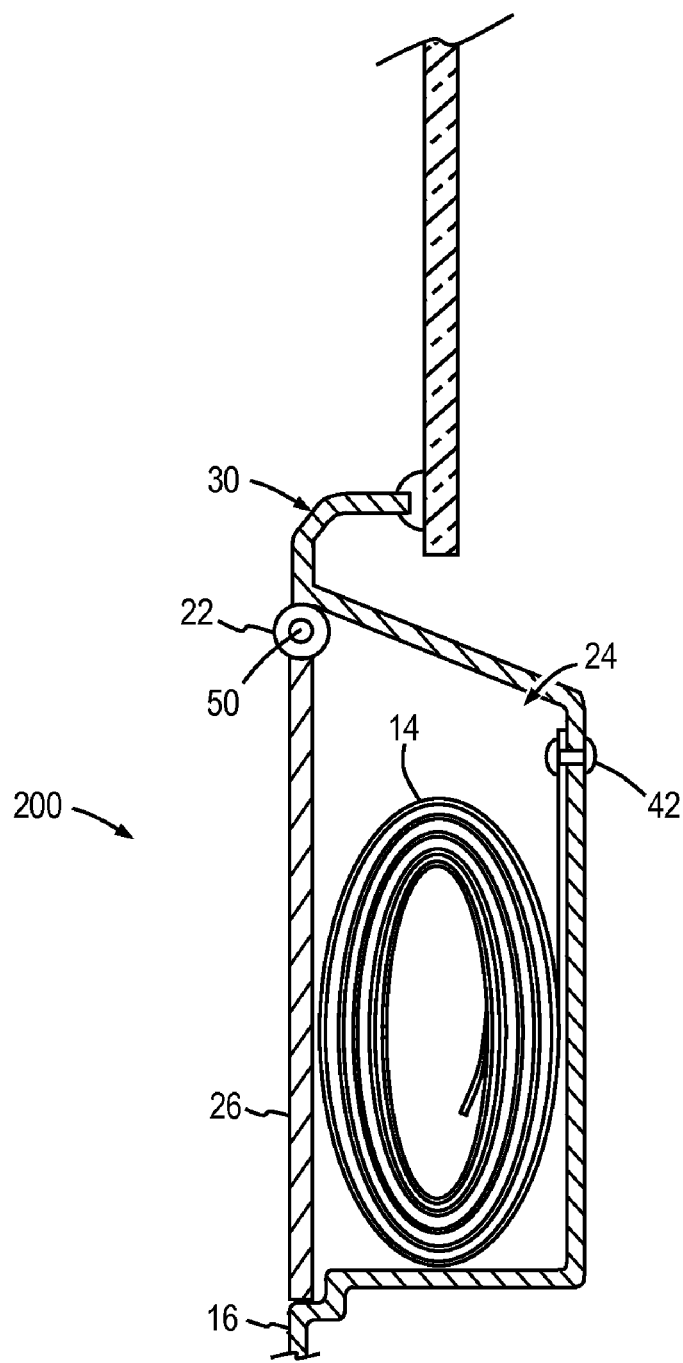
FIG. 13 is a schematic diagram of another alternate embodiment of a tonneau cover storage system for a motor vehicle, shown in a stowed condition.
Figure 14:
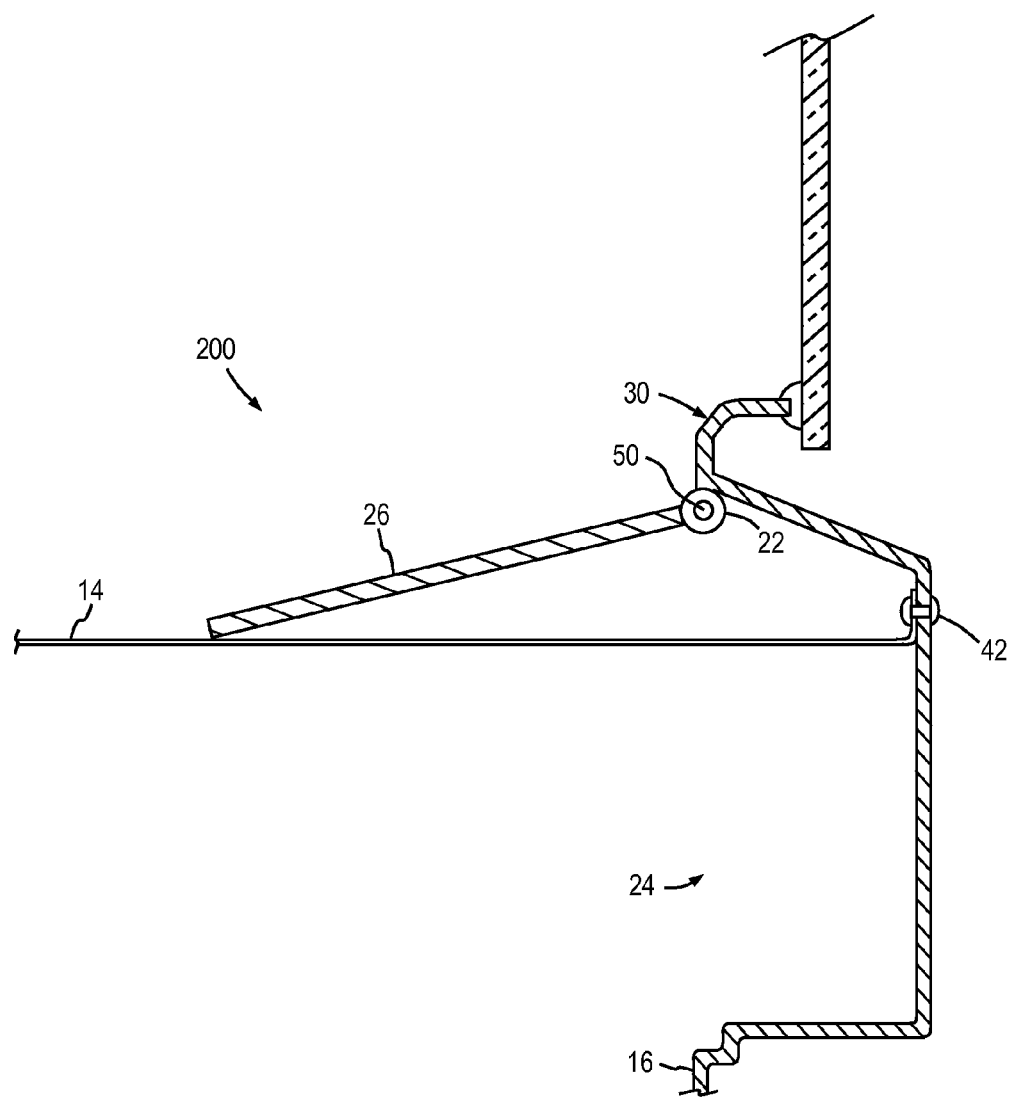
FIG. 14 is a schematic diagram of the system of FIG. 13 in a deployed condition.

A tonneau cover storage system 200 is shown in FIGS. 13 and 14 according to another alternate embodiment of the present invention. In this embodiment cavity 24 is utilized for storage of tonneau cover 14, lid 26 selectably closing off the cavity. Tonneau cover 14 may be secured at one end to vertical frame member 16 within cavity 24 with one or more fasteners 42. Storage system 200 is otherwise similar to system 10.

Figure 15:
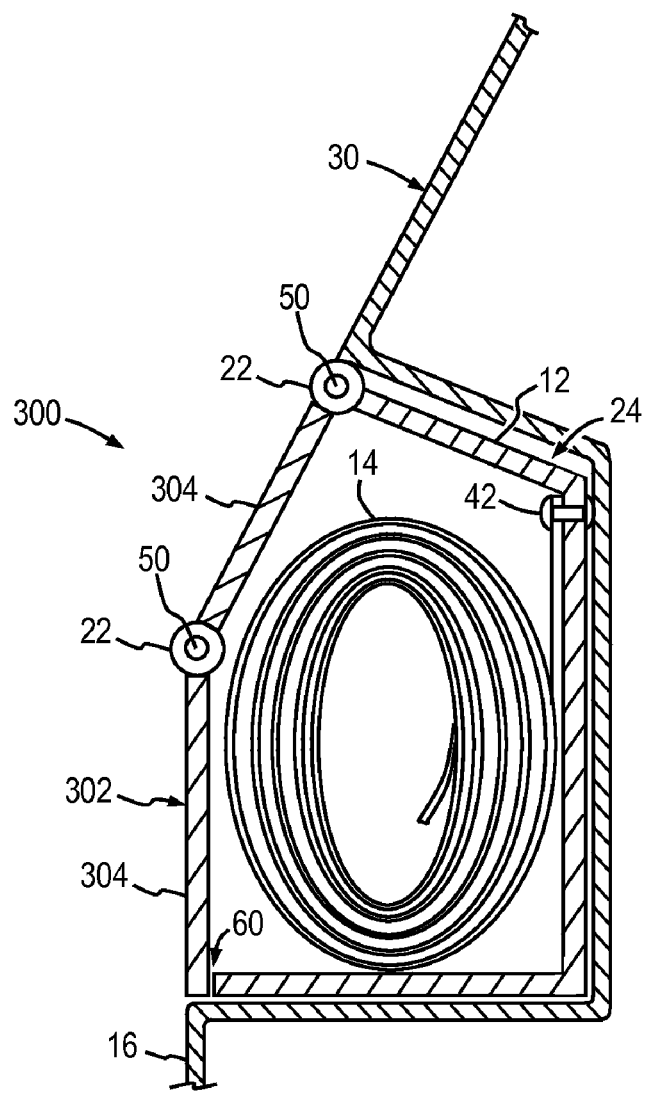
FIG. 15 is a schematic diagram of yet another alternate embodiment of a tonneau cover storage system for a motor vehicle, shown in a stowed condition.
Figure 16:
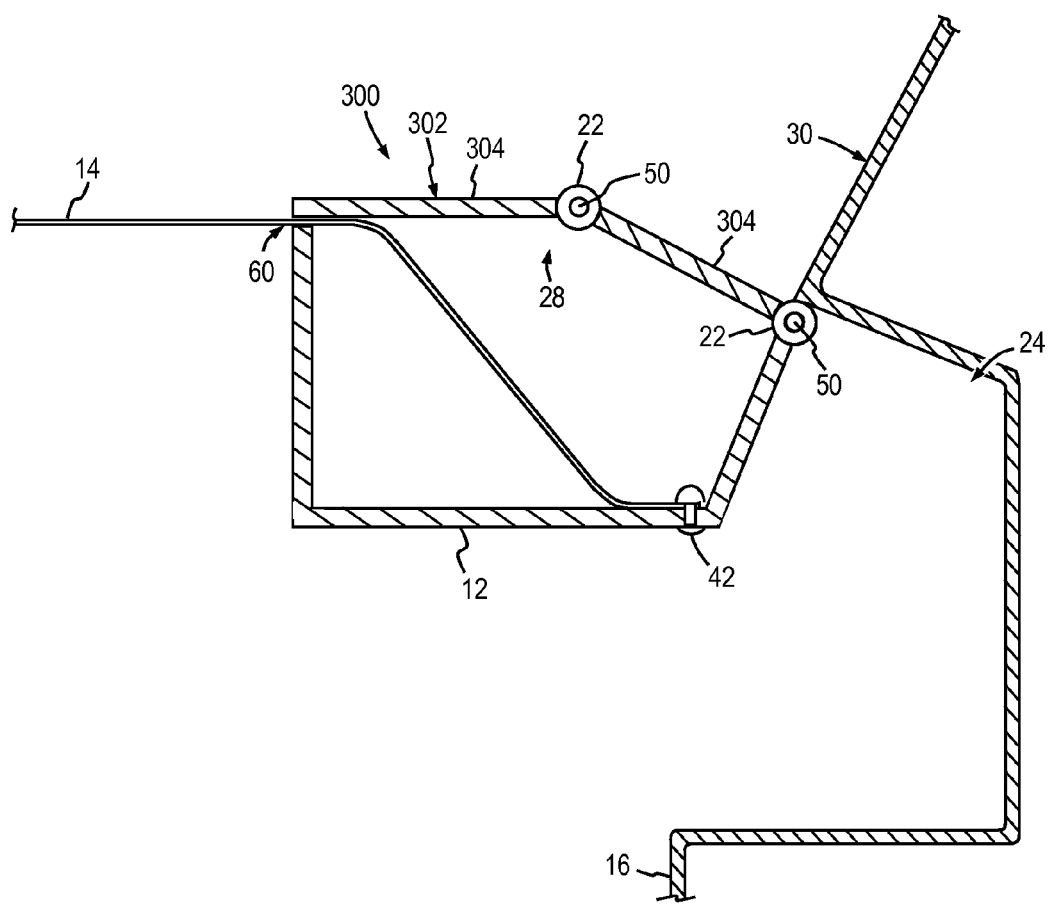
FIG. 16 is a schematic diagram of the system of FIG. 15 in a deployed condition.

A tonneau cover storage system 300 is shown in FIGS. 15 and 16 according to yet another alternate embodiment of the present invention. In this embodiment a lid 302 closes off cavity 24. Lid 302 includes a plurality of pivot points such as hinges 22 pivotably joining together a plurality of adjacent lid panels 304, allowing the lid to conform with angled and non-uniform shapes of cargo compartment 18. Two hinges 22 and two lid panels 304 are shown in FIGS. 15 and 16 for purposes of illustration, but a greater number may be utilized within the scope of the invention. Storage system 300 is otherwise similar to system 10.

Figure 17:
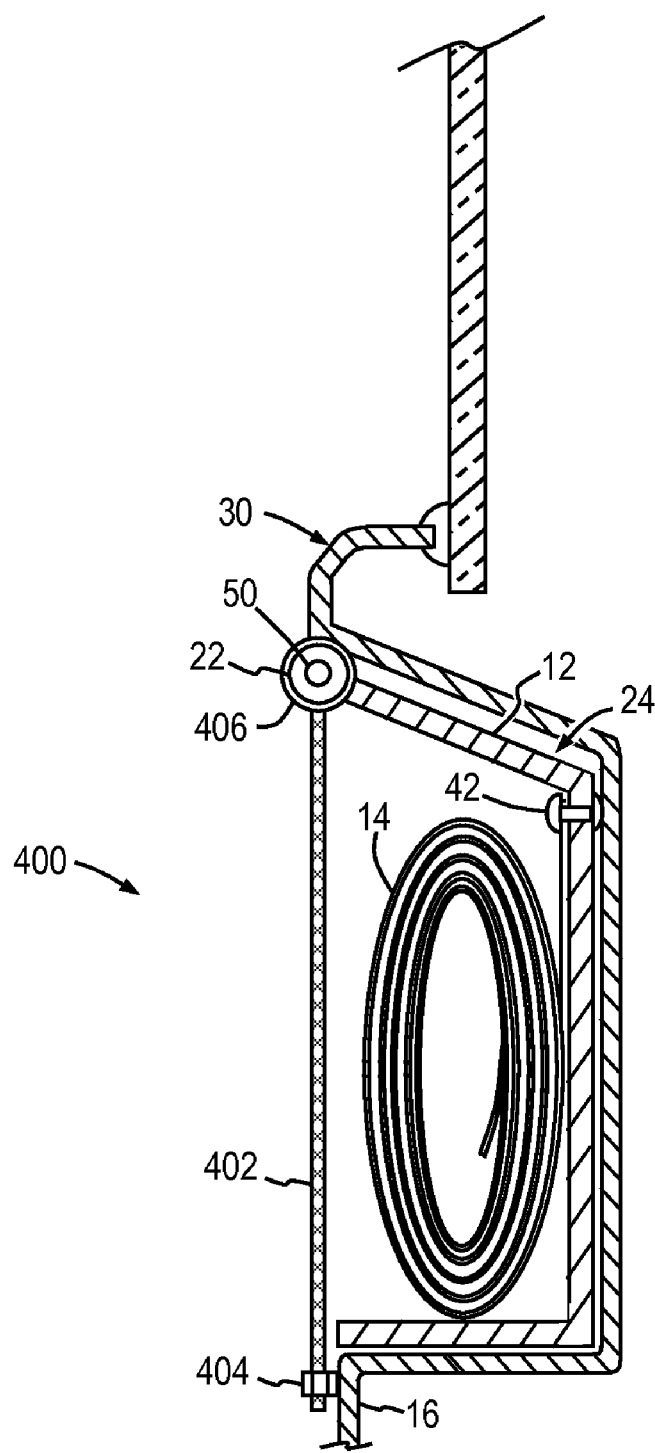
FIG. 17 is a schematic diagram of still another alternate embodiment of a tonneau cover storage system for a motor vehicle, shown in a stowed condition.
Figure 18:
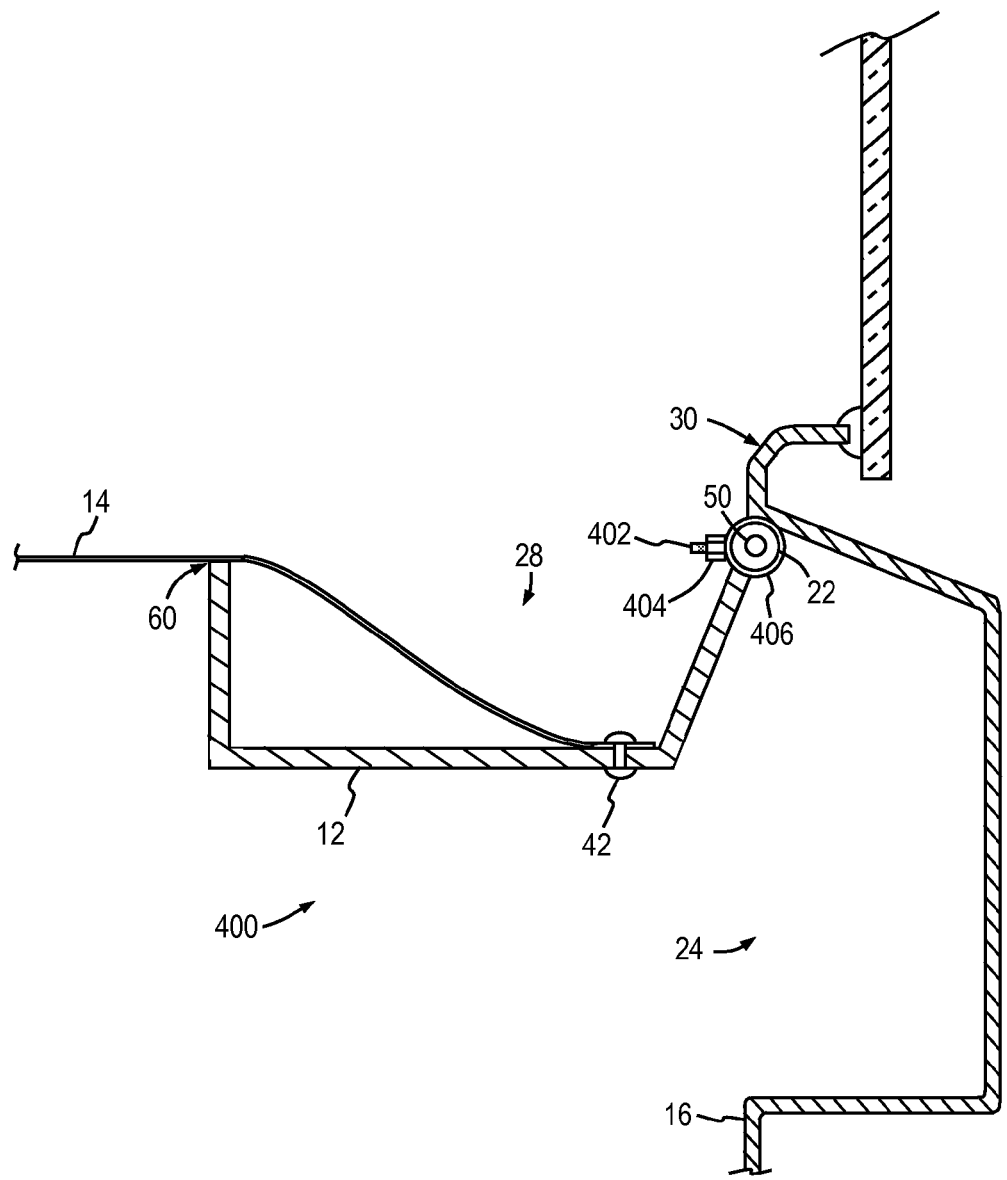
FIG. 18 is a schematic diagram of the system of FIG. 17 in a deployed condition.

A tonneau cover storage system 400 is shown in FIGS. 17 and 18 according to still another alternate embodiment of the present invention. In this embodiment a flexible lid 402 selectably closes off cavity 24. Flexible lid 402 may be attached proximate hinge 22 in any convenient arrangement, such as adjacent to the hinge, between a pair of spaced-apart hinges, or integral with the hinge. Flexible lid 402 may be made from any material suitable for use with storage system 400 and the expected environment including, without limitation, fabric, plastics such as vinyl, elastics such as natural and synthetic rubber, and leather. Flexible lid 402 may further include one or more fasteners 404 to selectably secure the lid to vertical frame member 16 of forward sidewall 30. Fastener 404 may be any type of fastener suitable for a particular tonneau cover storage system including, without limitation, hook-and-loop, snaps, magnets and clamps. In some embodiments flexible lid 402 may also be selectably extendable and retractable about a biased, rotatable roller tube 406 having a return mechanism and an intermittently operable ratchet mechanism for holding the lid against a rewinding force in a desired extended or retracted position in a manner similar to a conventional roller shade.

While this invention has been shown and described with respect to several detailed embodiments thereof, it will be understood by those skilled in the art that changes in form and detail thereof may be made without departing from the scope of the claims of the invention. For example, although cargo compartment 18 is described in relation to a pickup truck herein, it will be appreciated that the present invention is equally applicable to a cargo area of a hatchback, station wagon or other type of motor vehicle.

What is claimed is:

1. A tonneau cover storage system for a vehicle, comprising:
    a cargo compartment having a cargo opening and a forward wall, the forward wall including a vertical frame member; a cavity in the vertical frame member;
    a container pivotably coupled to the vertical frame member proximate the cavity at a first pivot point, the container having a container opening and being sized and shaped to selectably fit into the cavity;
    a lid pivotably attached to the first pivot point and pivotable independently of the container, the lid selectably closing off the container opening; and
    a flexible tonneau cover selectably configurable between a stowed condition within the container and a deployed condition closing off the cargo opening, wherein the container is movable to a position within the cavity when the tonneau cover is in the stowed condition, and is further movable to a position outside the cavity when the tonneau cover is in the deployed condition.

2. The tonneau cover storage system of claim 1, further comprising at least one fastener attaching the tonneau cover to the container.

3. The tonneau cover storage system of claim 2, further comprising an opening defined by the lid and the container, the tonneau cover extending through the opening when in the deployed condition.

4. The tonneau cover storage system of claim 1 wherein the lid further includes a grip.

5. The tonneau cover storage system of claim 1, further comprising a lid latch to selectably secure the lid to the container.

6. The tonneau cover storage system of claim 1, further comprising a lock (64) to selectably secure the lid to the forward wall.

7. The tonneau cover storage system of claim 1, further comprising a container latch to selectably secure the container to the forward wall.

8. The tonneau cover storage system of claim 1, further comprising a biasing member between the lid and the container.

9. The tonneau cover storage system of claim 1, further comprising a biasing member between the container and the forward wall.

10. The tonneau cover storage system of claim 1, further comprising:
    a tailgate spaced apart from the first sidewall and a pair of spaced-apart lateral sidewalls extending between the forward wall and the tailgate, the cargo opening being defined by a perimeter formed by the forward wall, the lateral sidewalls and the tailgate; and
    at least one fastener to secure the tonneau cover to the perimeter to selectably close off the cargo opening.

11. The tonneau cover storage system of claim 1 wherein the tonneau cover is made from one of fabric, plastic, elastic, and leather.

12. The tonneau cover storage system of claim 1 wherein the lid comprises a plurality of lid panels pivotably joined together.

* * * * *

UNITED STATES PATENT AND TRADEMARK OFFICE
CERTIFICATE OF CORRECTION

PATENT NO.         : 8,087,713 B2                                        Page 1 of 1
APPLICATION NO.    : 12/558082
DATED              : January 3, 2012
INVENTOR(S)        : Michael A. Schrader et al.

It is certified that error appears in the above-identified patent and that said Letters Patent is hereby corrected as shown below:

Column 6, line 39, "a lock (64) to selectably" should read --a lock to selectably--

Signed and Sealed this
Twenty-seventh Day of March, 2012

David J. Kappos
*Director of the United States Patent and Trademark Office*